(12) United States Patent
Dunaway

(10) Patent No.: US 10,281,248 B2
(45) Date of Patent: May 7, 2019

(54) GAS GENERATORS, LAUNCH TUBE ASSEMBLIES INCLUDING GAS GENERATORS, AND RELATED SYSTEMS AND METHODS

(71) Applicant: Northrop Grumman Innovation Systems, Inc., Plymouth, MN (US)

(72) Inventor: James D. Dunaway, Brigham City, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 548 days.

(21) Appl. No.: 14/938,646

(22) Filed: Nov. 11, 2015

(65) Prior Publication Data

US 2017/0131070 A1    May 11, 2017

(51) Int. Cl.
  *F41F 3/04* (2006.01)
  *F42B 3/04* (2006.01)
  *B60R 21/264* (2006.01)

(52) U.S. Cl.
  CPC ............ *F42B 3/04* (2013.01); *B60R 21/2644* (2013.01); *F41F 3/04* (2013.01)

(58) Field of Classification Search
  CPC .......... F42B 3/04; F41F 3/04; B60R 21/2644; B60R 21/261; B60R 21/26
  USPC ........................................................ 89/1.818
  See application file for complete search history.

(56) References Cited

U.S. PATENT DOCUMENTS

| | | | |
|---|---|---|---|
| 2,966,827 A | 1/1961 | Harvey | |
| 3,550,501 A | 12/1970 | Munger et al. | |
| 3,611,941 A | 10/1971 | Hopmeier | |
| 3,713,391 A | 1/1973 | Stout, Jr. et al. | |
| 3,724,870 A | * 4/1973 | Kurokawa | B60R 21/2644 102/531 |
| 3,745,876 A | 7/1973 | Rocha | |
| 3,946,638 A | 3/1976 | Cobb | |

(Continued)

FOREIGN PATENT DOCUMENTS

WO    9635916 A1    11/1996

OTHER PUBLICATIONS

Switchblade, Features and Specifications, www.avinc.com/switchblade, vol. 1 (2012) 1 page.

(Continued)

*Primary Examiner* — Michelle Clement
(74) *Attorney, Agent, or Firm* — TraskBritt

(57) ABSTRACT

A gas generator includes a housing sized and configured to be located within a launch tube for a projectile. The housing defines a first propellant chamber; at least a second propellant chamber comprising a ring situated concentrically around the first propellant chamber; an expansion chamber; at least one first aperture between the first propellant chamber and the expansion chamber; and at least one second aperture between the at least a second propellant chamber and the expansion chamber. The gas generator also includes at least one propellant within each of the first propellant chamber and the at least a second propellant chamber of the housing; and a pyrotechnic delay connecting the first propellant chamber and the second propellant chamber. A launch tube assembly includes a tube containing at least one projectile and a gas generator. Related methods of launching a projectile are also disclosed.

22 Claims, 5 Drawing Sheets

(56) References Cited

U.S. PATENT DOCUMENTS

| | | | | |
|---|---|---|---|---|
| 4,136,894 | A * | 1/1979 | Ono | B60R 21/26 102/443 |
| 4,296,084 | A * | 10/1981 | Adams | B60R 21/2644 422/166 |
| 4,523,538 | A | 6/1985 | Hollmann et al. | |
| 4,671,163 | A | 6/1987 | Erikson | |
| 4,716,830 | A | 1/1988 | Davis et al. | |
| 4,943,086 | A * | 7/1990 | Cunningham | B01J 7/00 280/741 |
| 5,419,875 | A * | 5/1995 | Decker | B60R 21/2644 280/736 |
| 5,423,384 | A * | 6/1995 | Galbraith | A62C 35/023 149/21 |
| 5,460,405 | A * | 10/1995 | Faigle | B60R 21/01554 280/735 |
| 5,466,420 | A * | 11/1995 | Parker | B01D 46/0043 280/736 |
| 5,481,977 | A | 1/1996 | Evans et al. | |
| 5,556,132 | A * | 9/1996 | Sampson | B60R 21/2644 280/741 |
| 5,564,741 | A * | 10/1996 | Ward | B60R 21/2644 280/740 |
| 5,622,380 | A * | 4/1997 | Khandhadia | B60R 21/2644 102/531 |
| 5,631,441 | A * | 5/1997 | Briere | F42B 5/15 102/326 |
| 5,658,010 | A * | 8/1997 | Steffens, Jr. | B60R 21/203 280/731 |
| 5,668,341 | A | 9/1997 | Reynolds et al. | |
| 5,803,494 | A * | 9/1998 | Headley | B60R 21/264 280/736 |
| 5,808,232 | A * | 9/1998 | Siddiqui | B01D 39/06 102/530 |
| 5,819,526 | A | 10/1998 | Jackson et al. | |
| 5,837,919 | A | 11/1998 | Yagla et al. | |
| 5,839,754 | A * | 11/1998 | Schluter | B60R 21/2644 280/736 |
| 5,847,307 | A | 12/1998 | Kennedy et al. | |
| 5,942,712 | A | 8/1999 | Mello | |
| 5,988,069 | A * | 11/1999 | Bailey | F42B 3/103 102/202.14 |
| 5,992,881 | A * | 11/1999 | Faigle | B60R 21/264 102/531 |
| 6,044,746 | A | 4/2000 | Gendre et al. | |
| 6,077,372 | A * | 6/2000 | Mendenhall | C06B 21/0083 149/109.6 |
| 6,079,310 | A | 6/2000 | Yagla et al. | |
| 6,079,745 | A * | 6/2000 | Wier | B60R 22/4633 102/202.14 |
| 6,095,558 | A * | 8/2000 | Bayer | B60R 21/2644 280/741 |
| 6,116,348 | A * | 9/2000 | Drakin | A62C 5/006 169/12 |
| 6,119,454 | A | 9/2000 | Valisko | |
| 6,126,197 | A * | 10/2000 | Muir | B60R 21/2644 280/741 |
| 6,142,515 | A * | 11/2000 | Mika | B60R 21/2644 102/531 |
| 6,213,501 | B1 * | 4/2001 | Hock | B60R 21/2644 280/736 |
| 6,230,629 | B1 | 5/2001 | Doctor et al. | |
| 6,260,797 | B1 | 7/2001 | Palmer | |
| 6,354,218 | B1 * | 3/2002 | Weise | F42B 5/16 102/286 |
| 6,418,870 | B1 | 7/2002 | Lanowy et al. | |
| 6,543,805 | B2 * | 4/2003 | McFarland | B60R 21/2644 102/531 |
| 6,644,206 | B2 * | 11/2003 | Fogle, Jr. | B60R 21/2644 102/530 |
| 6,659,500 | B2 * | 12/2003 | Whang | B60R 21/2644 280/736 |
| 6,701,849 | B2 * | 3/2004 | McFarland | B60R 21/2644 102/530 |
| 6,796,581 | B2 * | 9/2004 | Karray | B60R 21/26 280/741 |
| 6,860,511 | B2 * | 3/2005 | Patterson | B60R 21/2644 280/741 |
| 6,983,955 | B2 * | 1/2006 | Bergerson | B60R 21/264 280/735 |
| 7,013,788 | B1 * | 3/2006 | Williams | F41A 21/28 89/1.81 |
| 7,147,249 | B2 * | 12/2006 | Hofmann | B60R 21/2644 280/741 |
| 7,182,014 | B2 | 2/2007 | Smith | |
| 7,188,567 | B1 * | 3/2007 | Italiane | B60R 21/264 102/367 |
| 7,267,365 | B2 * | 9/2007 | Quioc | B60R 21/2644 280/736 |
| 7,313,881 | B1 | 1/2008 | Gieseke et al. | |
| 7,806,954 | B2 * | 10/2010 | Quioc | B60R 21/2644 102/202.14 |
| 7,950,693 | B2 * | 5/2011 | Jackson | B60R 21/263 102/530 |
| 8,011,303 | B2 * | 9/2011 | Nakayasu | B60R 21/2644 102/530 |
| 8,294,287 | B2 | 10/2012 | Oleynik et al. | |
| 8,424,909 | B2 * | 4/2013 | Kobayashi | F42B 3/04 102/530 |
| 8,444,179 | B2 * | 5/2013 | McFarland | B60R 21/2644 102/530 |
| 8,720,944 | B2 * | 5/2014 | Kobayashi | B60R 21/2644 102/530 |
| 8,967,046 | B2 * | 3/2015 | Dunaway | F42B 3/04 102/202 |
| 9,016,207 | B2 * | 4/2015 | Tasaki | B60R 21/2644 102/530 |
| 9,550,471 | B1 * | 1/2017 | Quioc | C06D 5/00 |
| 9,682,259 | B2 * | 6/2017 | Sampson | A62C 13/22 |
| 9,840,224 | B2 * | 12/2017 | Bierwirth | B60R 21/261 |
| 9,878,684 | B2 * | 1/2018 | Tanaka | B60R 21/235 |
| 9,919,173 | B2 * | 3/2018 | Blau | A62C 99/0018 |
| 9,944,244 | B1 * | 4/2018 | Hordos | B60R 21/272 |
| 9,945,645 | B2 * | 4/2018 | Yamauchi | F42B 3/121 |
| 9,953,779 | B2 * | 4/2018 | Jung | H01H 33/666 |
| 2003/0034641 | A1 | 2/2003 | Zimbrich et al. | |
| 2003/0160437 | A1 * | 8/2003 | Ohji | B60R 21/2644 280/736 |
| 2004/0050281 | A1 * | 3/2004 | Hofmann | B60R 21/2644 102/200 |
| 2005/0257866 | A1 * | 11/2005 | Williams | C06B 21/0025 149/36 |
| 2009/0308274 | A1 | 12/2009 | Schroeder et al. | |
| 2010/0117344 | A1 * | 5/2010 | Windhausen | B60R 21/261 280/737 |
| 2011/0221175 | A1 * | 9/2011 | Kobayashi | B60R 21/2644 280/741 |
| 2013/0087348 | A1 * | 4/2013 | Sampson | A62C 5/006 169/46 |
| 2014/0144340 | A1 * | 5/2014 | Smith | B60R 21/2644 102/202.9 |
| 2014/0150683 | A1 * | 6/2014 | Dunaway | F42B 3/04 102/530 |

OTHER PUBLICATIONS

Definition of Concentric by Merriam-Webster, https://www.merriam-webster.com/dictionary/concentric, web page visited Aug. 20, 2018, 4 pages.

\* cited by examiner

GAS GENERATORS, LAUNCH TUBE ASSEMBLIES INCLUDING GAS GENERATORS, AND RELATED SYSTEMS AND METHODS

TECHNICAL FIELD

The current disclosure relates generally to gas generators. In particular, the current disclosure generally relates to gas generators for use in launch tubes to launch projectiles, launch tubes including such gas generators, projectile systems including such launch tubes, and related methods.

BACKGROUND

Projectiles, such as missiles, rockets, and the like, are launched from various types of launch tubes (e.g., canisters, guns, one or more cells of a vertical launching system (VLS), torpedo tubes, etc.). In some projectile systems, thrust from a thrust source in the form of an integrated projectile motor or propellant carried by the projectile is used to launch the projectile from the launch tube. However, using the thrust generated internally by the projectile thrust to launch the projectile (i.e., a hot launch), reduces the amount of fuel for the motor or propellant available to propel the projectile to an intended target after the projectile leaves the launch tube.

In response to this problem, some projectile systems employ a launching propellant, which is separate from the projectile's propellant, to launch the projectile from the launch tube and to provide an initial velocity to the projectile (i.e., a cold launch). For example, projectile systems may include a projectile disposed in a launch tube with a launching propellant and a pusher plate, which may also be characterized as a ram plate, positioned at the aft end of the projectile in the launch tube. When the projectile is to be launched from the launch tube, a propellant igniter is activated to ignite the propellant. Expanding gases generated by the burning propellant push the plate and the projectile out through the open end of the launch tube. The thrust source carried by the projectile (e.g., a motor and/or propellant) may then be initiated to further accelerate the projectile and propel it to its intended target.

In many applications, it is desirable to minimize the size and cost of the overall projectile system including the projectile, launch tube, and launching propellant. However, the selection, volume, and configuration of the launching propellant deployed within a launch tube may require reinforcing the launch tube, pusher plate (where implemented), and projectile because gas pressure and heat from the burning propellant may damage these components, causing launch failure or decreasing the likelihood that components of the projectile system may be reused. Unfortunately, such reinforcements of the components of the projectile system may increase the cost, size, and overall weight of the projectile system. Further, in order to propel the projectile at a selected rate of acceleration and velocity, the selection, volume and configuration of the launching propellant (e.g., the use of multiple initiators and gas generants) may require excessive space in the launch tube, add to the overall size, weight, and cost of the launch tube, and may require the use of complex initiation systems and relatively expensive gas generants.

BRIEF SUMMARY

In some embodiments, the present disclosure includes a gas generator for use in launching a projectile. The gas generator includes a housing sized and configured to be located within a launch tube for the projectile. The housing defines a first propellant chamber; at least a second propellant chamber comprising a ring situated concentrically around the first propellant chamber; an expansion chamber; at least one first aperture between the first propellant chamber and the expansion chamber; and at least one second aperture between the at least a second propellant chamber and the expansion chamber. The gas generator also includes at least one propellant within each of the first propellant chamber and the at least a second propellant chamber of the housing. A pyrotechnic delay connects the first propellant chamber and the at least a second propellant chamber.

In additional embodiments, the present disclosure includes a launch tube assembly. The launch tube assembly includes a launch tube containing at least one projectile and a gas generator within the launch tube proximate the projectile. The gas generator includes a housing that defines a first propellant chamber; at least a second propellant chamber comprising a ring situated concentrically around the first chamber; an expansion chamber; at least one first aperture between the first propellant chamber and the expansion chamber; and at least one second aperture between the at least a second propellant chamber and the expansion chamber. The gas generator also includes at least one propellant within each of the first propellant chamber and the at least a second propellant chamber of the housing. A pyrotechnic delay connects the first propellant chamber and the second propellant chamber.

In additional embodiments, the present disclosure includes a method of launching a projectile. The method includes igniting a first propellant within a first propellant chamber within a housing; igniting a pyrotechnic delay within the housing; igniting a second propellant within at least a second propellant chamber within the housing, combusting at least a portion of the first propellant and the second propellant to form a gas; flowing the gas into an expansion chamber within the housing; flowing the gas through a plurality of apertures formed in the housing to form at least one propulsive jet exiting the housing; and imparting an initial velocity to a projectile with the at least one propulsive jet. The second propellant chamber includes a ring situated concentrically around the first propellant chamber.

BRIEF DESCRIPTION OF THE DRAWINGS

While the specification concludes with claims particularly pointing out and distinctly claiming that which is regarded as embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular material, device, apparatus, system, or method, but are merely idealized representations employed to describe embodiments of the present disclosure. Additionally, elements common between figures may retain the same numerical designation for convenience and clarity.

Figure 1:
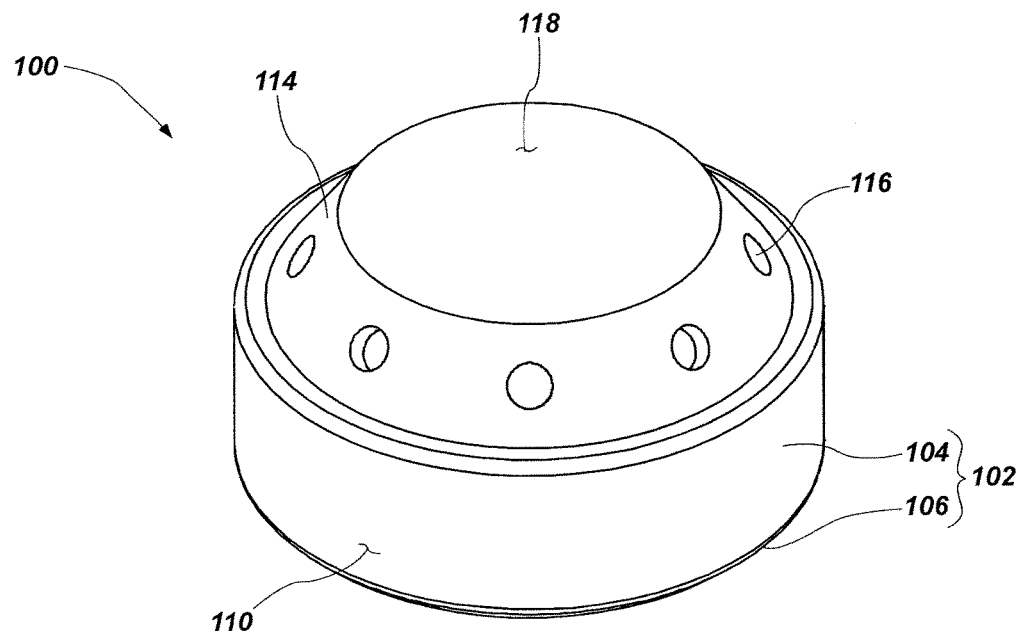
FIG. 1 is a perspective view of a gas generator in accordance with an embodiment of the present disclosure.
Figure 2:
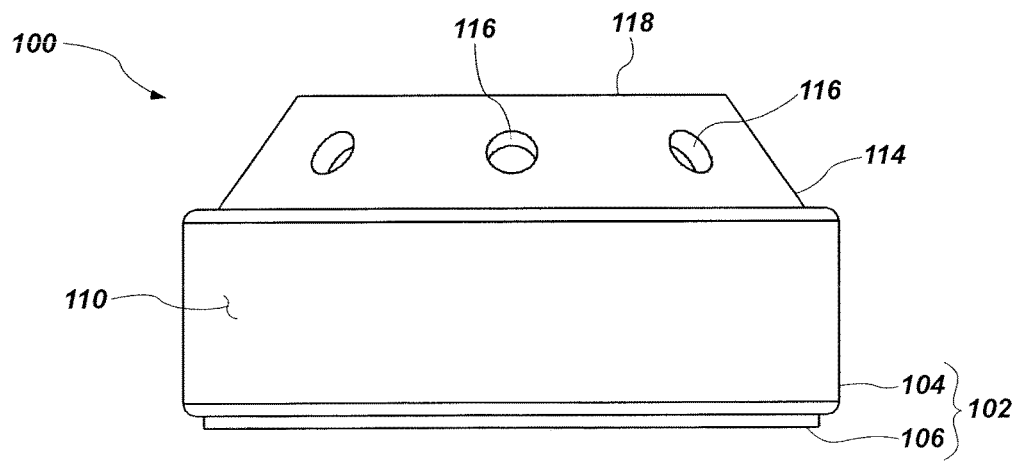
FIG. 2 is a side view of the gas generator shown in FIG. 1.
Figure 3:
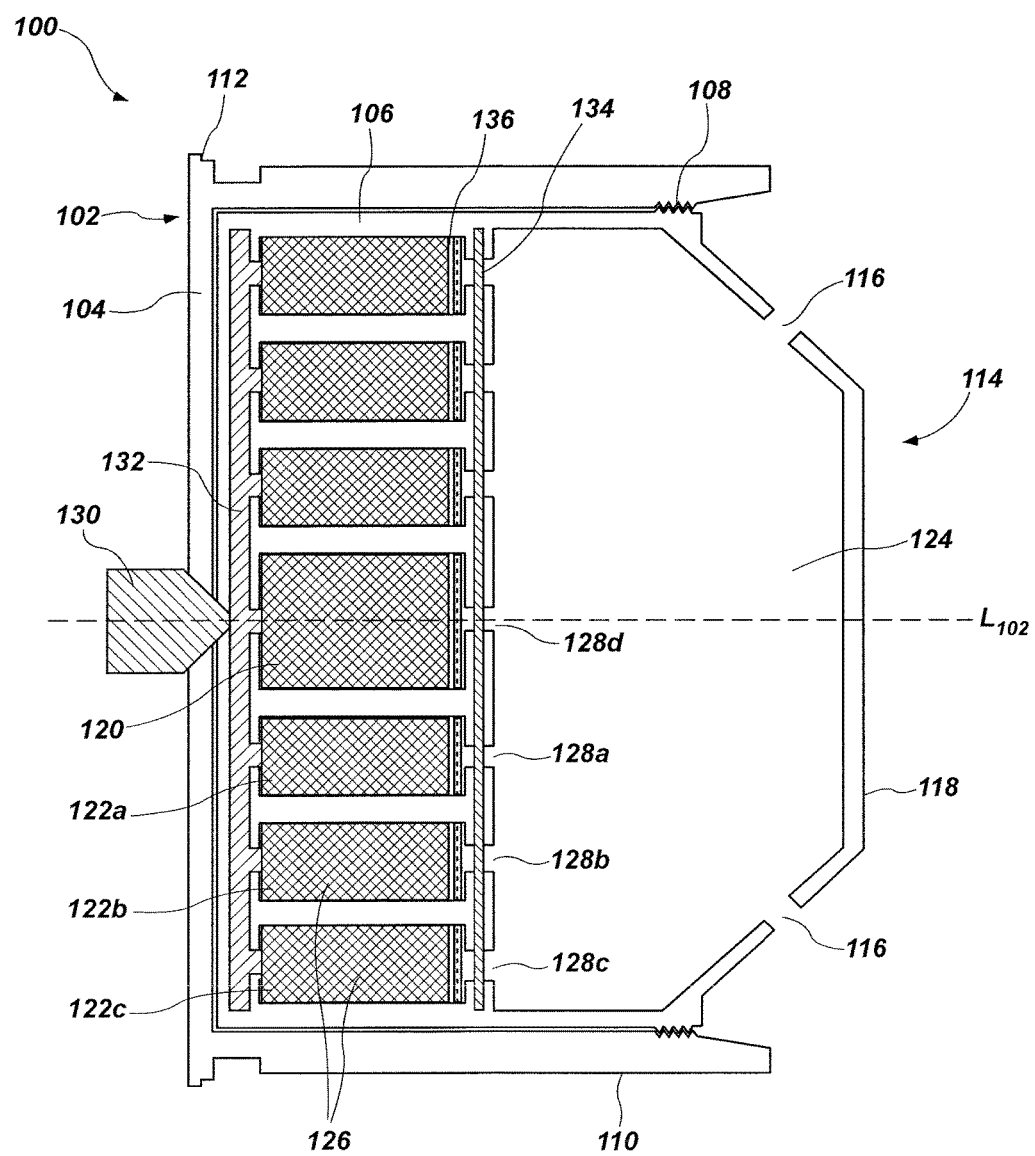
FIG. 3 is a schematic cross-sectional rendering of a gas generator.
Figure 4A:
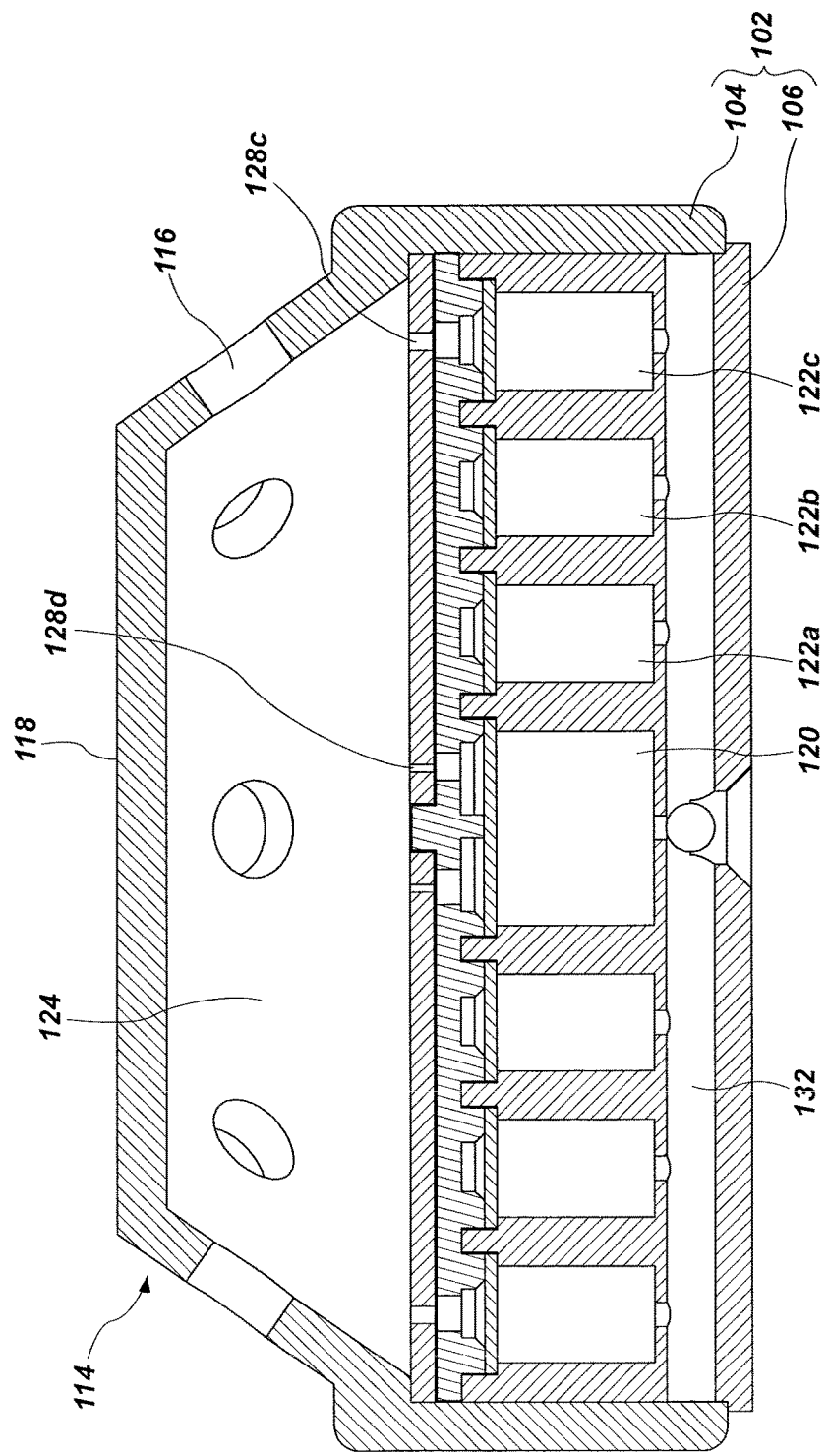
FIG. 4A is a simplified side cutaway view of a housing of the gas generator shown in FIG. 1.
Figure 4B:
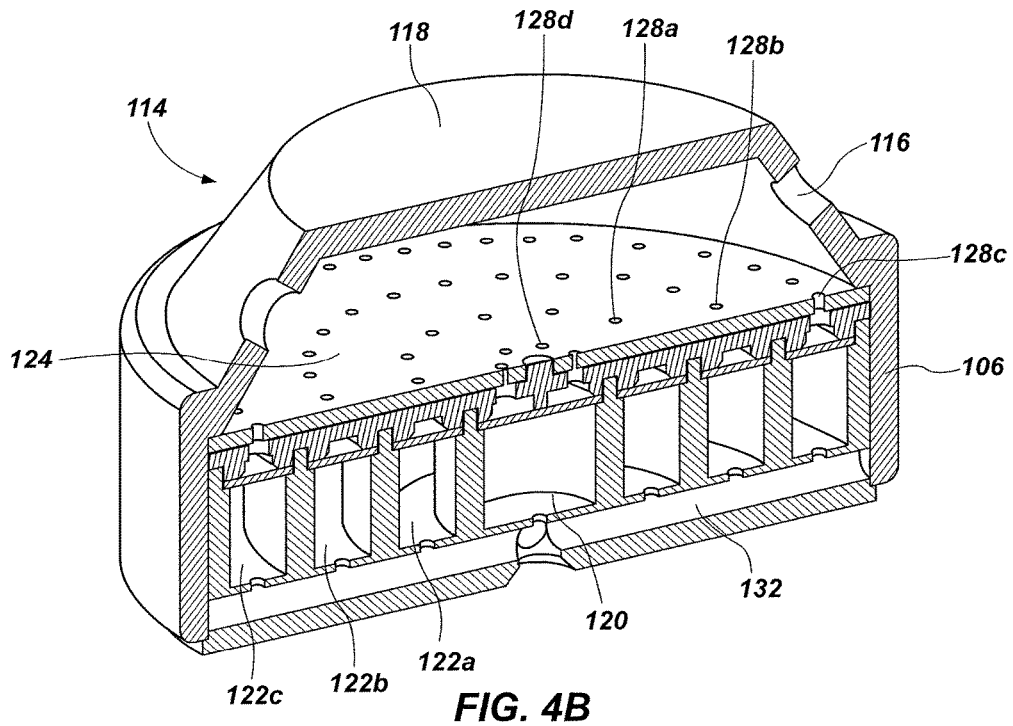
FIG. 4B is a simplified three-dimensional cutaway view of the housing of the gas generator shown in FIG. 1.
Figure 5:
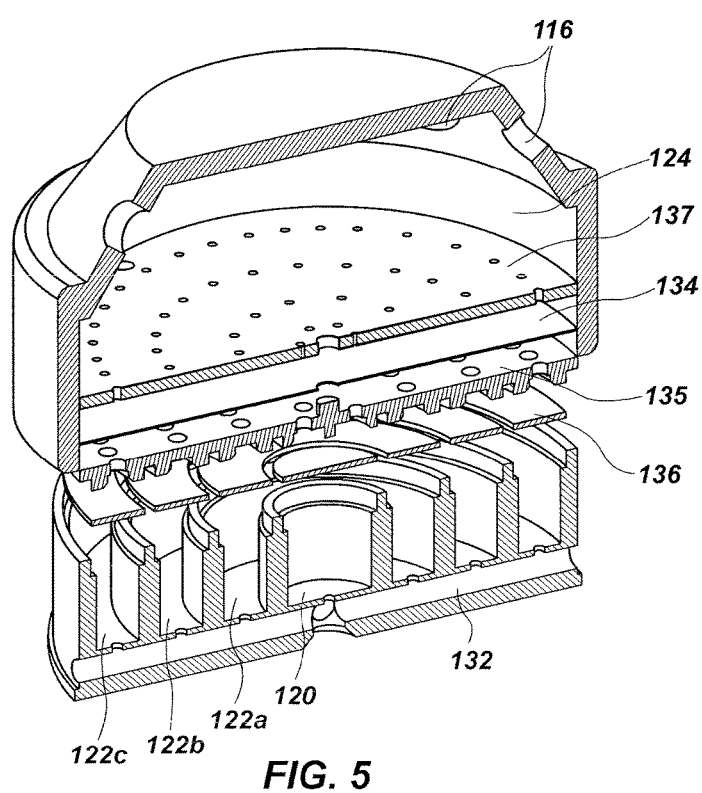
FIG. 5 is an exploded simplified three-dimensional cutaway view of the housing of the gas generator shown in FIG. 1.

FIG. 1 is a perspective view of a gas generator 100 for use in launching a projectile. FIG. 2 is a side view of the gas generator 100, and FIG. 3 is schematic cross-sectional rendering of the gas generator 100. As shown in FIGS. 1 and 2, the gas generator 100 includes a housing 102, which may be formed from a relatively lightweight structural material such as a metal, a metal alloy (e.g., aluminum), a composite material (e.g., a carbon fiber composite), or combinations thereof having a longitudinal axis $L_{102}$ (e.g., centerline), as shown in FIG. 3. In some embodiments, the housing 102 may include an outer housing 104 and an inner housing 106 at least partially received within the outer housing 104. FIG. 4A is a simplified side cutaway view of the housing 102, and FIG. 4B is a simplified three-dimensional cutaway view of the inner housing 102. FIG. 5 is an exploded simplified three-dimensional cutaway view of the inner housing 106. As depicted, the housing 102 is configured to have a substantially cylindrical transverse cross-sectional shape including a cylindrical outer surface 110 appropriately sized to fit within a launch tube. Of course, the disclosure is not so limited, and other shapes for gas generators and associated launch tubes are contemplated. For example, and as discussed below in greater detail with reference to FIGS. 6 and 7, the housing 102 may be configured to fit within a launch tube having a complementary cylindrical shape (e.g., a hollow inner tube).

The gas generator 100 includes an exit portion 114 for directing gases from the housing 102 of the gas generator 100. For example, the exit portion 114 comprises a side of the gas generator 100 (e.g., one face of the cylindrical housing 102) through which gases generated by combustion of propellant within the gas generator 100 are directed outward from the gas generator 100. As depicted, the exit portion 114 includes a portion of the housing 102 (e.g., the inner housing 106) having one or more apertures 116 formed in the housing 102 for directing gases from the interior of the housing 102 to the environment exterior of gas generator 100 and within the launch tube containing the gas generator 100 between the gas generator 100 and a projectile disposed within the launch tube. In some embodiments, apertures 116 may be formed in a ring-like structure on a side of the housing 102 (e.g., extending around protrusion 118). The housing 102 may include any suitable number of apertures 116 (e.g., one, two, three, four, five, six, seven, eight, nine, ten, etc.) and of a size as necessary to achieve a selected amount of thrust for a selected application.

FIG. 3 is a simplified schematic rendering of how the gas generator 100 may appear in some embodiments. As shown in FIG. 3, the housing 102 includes the inner housing 106 at least partially received within the outer housing 104. The inner housing 106 may be retained in the outer housing 104 by threads 108 or by another appropriate retaining mechanism. For example, in some embodiments, the inner housing 106 may be retained in the outer housing 104 by a welded joint. The housing 102 may further include a retaining feature 112 to secure the gas generator 100 within the launch tube and to seal against an inner wall of the launch tube to at least partially prevent gases formed by the gas generator 100 from traveling around the gas generator 100 to a back portion of the housing 102.

The housing 102 defines one or more chambers (e.g., plenums) within the housing 102 configured to contain a propellant 126. For example, a first, cylindrical propellant chamber 120 is located within a portion of the housing 102 (e.g., along the longitudinal axis $L_{102}$ of the housing 102). One or more second, annular propellant chambers 122a, 122b, 122c may be disposed concentrically around the cylindrical propellant chamber 120. FIG. 3 illustrates three annular propellant chambers 122a, 122b, 122c, but in other embodiments, the housing 102 may define any suitable number of annular propellant chambers. The annular propellant chambers 122a, 122b, 122c may have substantially the same radial width, or may have different radial widths. If the annular propellant chambers 122a, 122b, 122c each have the same radial width, the outermost annular propellant chamber 122c may have a larger volume than the middle annular propellant chamber 122b, which may have a larger volume than the inner annular propellant chamber 122a.

The housing 102 may also define an expansion chamber 124 in communication with each of the cylindrical propellant chamber 120 and the annular propellant chambers 122a, 122b, 122c. The expansion chamber 124 may have a volume substantially larger than any of the cylindrical propellant chamber 120 or individual annular propellant chambers 122a, 122b, 122c. In some embodiments, the expansion chamber 124 may have a volume larger than the cylindrical propellant chamber 120 and the annular propellant chambers 122a, 122b, 122c combined.

The cylindrical propellant chamber 120 and the annular propellant chambers 122a, 122b, 122c may each contain a mass of propellant 126. The propellant 126 may be any suitable explosive or reactive material (e.g., a low-order explosive such as a nitrocellulose-containing double-base propellant) capable of producing a fluid under pressure (e.g., gas) that may be directed from the housing 102 to produce a propulsive jet. The propellant 126 in each propellant chamber 120, 122a, 122b, 122c may have the same or different compositions as the propellant 126 in the other propellant chambers 120, 122a, 122b, 122c. The propellant 126 may be in the form of a powdered material, a cast material, or an extruded material (e.g., solids mixed with a binder material). The burn rate of the propellant 126 may be selected based on the amount of thrust to be produced by the gas generator 100, the size and shape of the cylindrical propellant chamber 120 and the annular propellant chambers 122a, 122b, 122c, the size and shape of the apertures 116, or any other design factors. If the annular propellant chambers 122a, 122b, 122c each have the same longitudinal thickness and radial width, the outermost annular propellant chamber 122c may have a larger mass of propellant 126 than the middle annular propellant chamber 122b, which may have a larger mass of propellant than the inner annular propellant chamber 122a. The amount of thrust generated by the propellant 126 may vary in proportion to the mass of the propellant 126 burning. Therefore, ignition of the propellant 126 in each of the cylindrical propellant chamber 120 and the annular propellant chambers 122a, 122b, 122c may correspond to different levels of thrust produced by the gas generator 100.

The cylindrical propellant chamber 120 and the annular propellant chambers 122a, 122b, 122c may be configured to be in communication with the expansion chamber 124 via apertures 128a, 128b, 128c, 128d formed in the housing 102 (e.g., in the inner housing 106). In some embodiments, multiple apertures 128a, 128b, 128c, 128d (e.g., two or more) may extend between the expansion chamber 124 and each of the cylindrical propellant chamber 120 and the annular propellant chambers 122a, 122b, 122c. As shown in FIGS. 4A and 4B, each of the cylindrical propellant chamber 120 and the annular propellant chambers 122a, 122b, 122c may be connected to the expansion chamber 124 by multiple apertures 128a, 128b, 128c, 128d spaced circumferentially around the propellant chambers 120, 122a, 122b, 122c. The number of the apertures 128a, 128b, 128c, 128d may vary based on the volume of the propellant chambers 120, 122a, 122b, 122c. For instance, if the annular propellant chambers 122a, 122b, 122c each have the same radial width, the outer annular propellant chamber 122c will have a larger volume than the inner annular propellant chamber 122a. Thus, the apertures 128c of the outer annular propellant chamber 122c may be more numerous than the apertures 128a of the inner annular propellant chamber 122a. The apertures 128a, 128b, 128c, 128d may extend longitudinally through the inner housing 106 in a direction generally parallel to the longitudinal axis $L_{102}$.

The apertures 128a, 128b, 128c, 128d may be sized and configured to control the rate that gases, produced in the propellant chambers 120, 122a, 122b, 122c by reaction of the ignited propellant 126, pass through the apertures 128a, 128b, 128c, 128d to the expansion chamber 124. For example, the apertures 128a, 128b, 128c, 128d may be formed to each have a diameter of less than 0.1 inch (2.54 mm), less than 0.05 inch (1.27 mm), or even less to control the rate of gases passing from the cylindrical propellant chamber 120 and the annular propellant chambers 122a, 122b, 122c to the expansion chamber 124. The apertures 128a, 128b, 128c, 128d may have differing sizes and diameters or combinations of diameters.

As described above, the inner housing 106 may include apertures 116 at the exit portion 114 of the gas generator 100 for directing gases from the expansion chamber 124 to the exterior environment adjacent to the gas generator 100. The apertures 116 may extend through a frustoconical wall around a protrusion 118 of the inner housing 106. The apertures 116 may extend in a direction angled outward with respect to the longitudinal axis $L_{102}$ of the housing 102 at an angle of the frustoconical wall to longitudinal axis $L_{102}$ to direct the gases outward and at an angle from the housing 102. For example, an angle between an axis of the apertures 116 and the longitudinal axis $L_{102}$ may be from about 10° to about 80°, such as from about 30° to about 60°, or from about 40° to about 50°.

In other embodiments, the apertures 116 may extend substantially parallel to the longitudinal axis $L_{102}$ through the housing 102. As used herein, the term "substantially parallel" means and includes a laterally outward angular orientation of about 5° or less to the longitudinal axis $L_{102}$ of the housing 102.

In other embodiments, the apertures 116 may extend in a direction angled inward with respect to the longitudinal axis $L_{102}$ of the housing 102, in which case the housing 106 may extend beyond the protrusion 118. For example, an angle between an axis of the apertures 116 and the longitudinal axis $L_{102}$ may be from about 10° to about 80°, such as from about 30° to about 60°, or from about 40° to about 50°.

As discussed above with regard to apertures 128a, 128b, 128c, 128d, the number and size (e.g., diameter) of the apertures 116 may be selected to control the rate that gases, which are supplied from the propellant chambers 120, 122a, 122b, 122c to the expansion chamber 124, are released from the housing 102 of the gas generator 100 (e.g., to achieve a selected amount of thrust for a selected application). For example, the apertures 116 (e.g., eight apertures 116) may be formed to each have a diameter of greater than 0.1 inch (2.54 mm), greater than 0.25 inch (6.34 mm), or even greater to control the rate of propellant gas passing from the expansion chamber 124 to the exterior of the housing 102 of the gas generator 100. By way of further example, the diameter of the apertures 116 may be selected to be greater than the diameter of the apertures 128a, 128b, 128c, 128d such that the pressure of the gas in the expansion chamber 124 is less than the pressure of the gas in the propellant chambers 120, 122a, 122b, 122c. In other words, the relatively larger diameter of apertures 116 provides less constriction of the flow of the gas therethrough than the relatively smaller diameter of apertures 128a, 128b, 128c, 128d. Such a configuration may enable the expansion chamber 124 to allow the gas to expand to a lower pressure as it enters the expansion chamber 124 via the apertures 128a, 128b, 128c, 128d.

Referring still to FIG. 3, the gas generator 100 includes an initiator 130 and a pyrotechnic delay 132 connecting the propellant chambers 120, 122a, 122b, 122c. The initiator 130 may be configured for igniting the pyrotechnic delay 132, which may, in turn, be configured for igniting the propellant 126. The initiator 130 may be selected from a wide variety of initiation devices suitable for initiating an exothermic reaction of the pyrotechnic delay 132. For example, the initiator 130 may include an initiation or detonation device such as, for example, an exploding foil initiator (EFI), a low energy exploding foil initiator (LEEFI), a blasting cap, an exploding-bridgewire detonator (EBW), a hot-wire initiator, or combinations thereof. The initiator 130 may be a commercially available airbag initiator, such as SDI Serviceable Initiator Assembly (Military) 192430, available from Ensign-Bickford Aerospace & Defense, of Simsbury, Conn.

As depicted in FIG. 3, the initiator 130 may be positioned in contact with or adjacent to the pyrotechnic delay 132, such that the initiator 130 can initiate reaction (e.g., burning) of the pyrotechnic delay 132. The pyrotechnic delay 132 may be a pyrotechnic material having a high burning rate (e.g., from about 1.00 in/s (2.54 cm/s) to about 200 in/s (508 cm/s)), and which emits hot particles when burned. For example, the pyrotechnic delay 132 may include boron potassium nitrate ($BKNO_3$), magnesium strontium nitrate ($MgSr(NO_3)_2$), a magnesium-potassium perchlorate, etc. The pyrotechnic delay 132 may be in the form of granules, a powder, etc. As shown in FIG. 3, the pyrotechnic delay 132 may be positioned in contact with or adjacent to the propellant 126 in the propellant chambers 120, 122a, 122b, 122c. As the pyrotechnic delay 132 burns, it may ignite the propellant 126 in the cylindrical propellant chamber 120, followed by the propellant 126 in the annular propellant chambers 122a, 122b, 122c, respectively.

Because the propellant 126 in each of the cylindrical propellant chamber 120 and the annular propellant chambers 122a, 122b, 122c have staggered ignition times, the gas generator 100 may have a linear to progressive thrust profile. That is, the amount of thrust (i.e., force) provided by gases leaving the gas generator 100 may be maintained or increase with time after ignition of the propellant 126 within the cylindrical propellant chamber 120. For example, the thrust may increase in a step-wise manner upon ignition of the propellant 126 within each of the annular propellant chambers 122a, 122b, 122c.

In some embodiments, because the propellant 126 in each of the cylindrical propellant chamber 120 and the annular propellant chambers 122a, 122b, 122c have staggered ignition times, the gas generator 100 may be configured to produce relatively high projectile velocity with relatively low acceleration in comparison with conventional gas generators. The thrust profile of the gas generator 100 can be tailored by changing the volumes of the propellant chambers 120, 122a, 122b, 122c.

In some embodiments, the initiator 130 may seal (e.g., hermetically seal) at least a portion of the pyrotechnic delay 132 within the inner housing 106. In some embodiments, the initiator 130 may be secured to the outer housing 104 or the inner housing 106 by a retaining ring, a crimp, a weld, threads, or another connection mechanism.

In some embodiments, the initiator 130 may include a connection feature (e.g., a pin connector) to connect the initiator 130 to a control system configured and operably coupled for initiating (e.g., by supplying an electrical signal) the initiator 130, for example, during a launch cycle of a projectile.

In some embodiments, in order to initially seal the propellant 126 (e.g., before initiation of the propellant 126, such as during manufacturing) in the propellant chambers 120, 122a, 122b, 122c and/or to build pressure in the propellant chambers 120, 122a, 122b, 122c in order to increase the burn rate of the propellant 126 therein, the propellant may be at least partially contained by a burst foil 134. For example, the burst foil 134 may be positioned over the propellant 126 such that the burst foil 134 is positioned over each of the apertures 128a, 128b, 128c, 128d between the expansion chamber 124 and the cylindrical propellant chamber 120 and the annular propellant chambers 122a, 122b, 122c. The burst foil 134 may at least partially seal the propellant 126 from exposure to the environment within the expansion chamber 124 until the propellant 126 begins to burn. In some embodiments, the burst foil 134 may be sandwiched between parallel plates 135, 137 (see FIG. 5), wherein the apertures 128a, 128b, 128c, 128d are formed through each of the parallel plates 135, 137.

In some embodiments, the gas generator 100 may include one or more screens 136 positioned adjacent the masses of propellant 126 between the propellant 126 and the apertures 128a, 128b, 128c, 128d. The screens 136 may reduce (e.g., minimize or substantially inhibit) the amount of solid material of the propellant 126 (e.g., grains of propellant 126) traveling from the cylindrical propellant chamber 120 and the annular propellant chambers 122a, 122b, 122c to the expansion chamber 124 through the apertures 128a, 128b, 128c, 128d. In other words, the screens 136 may act to enable gases produced by the propellant 126 to pass through the screens 136 and to substantially filter (e.g., inhibit) solid grains and solid combustion products of the propellant 126 from passing through the screens 136, reducing the probability that solid grains or solid combustion products of the propellant 126 may become lodged within, and partially or completely occlude the apertures 128a, 128b, 128c, 128d. In some embodiments, the screens 136 may be disposed between the plate 135 (FIG. 5) and walls of the propellant chambers 120, 122a, 122b, 122c. The screens 136 may be generally flat and have a shape corresponding to a cross-section of the propellant chambers 120, 122a, 122b, 122c (e.g., circular or annular).

Figure 6:
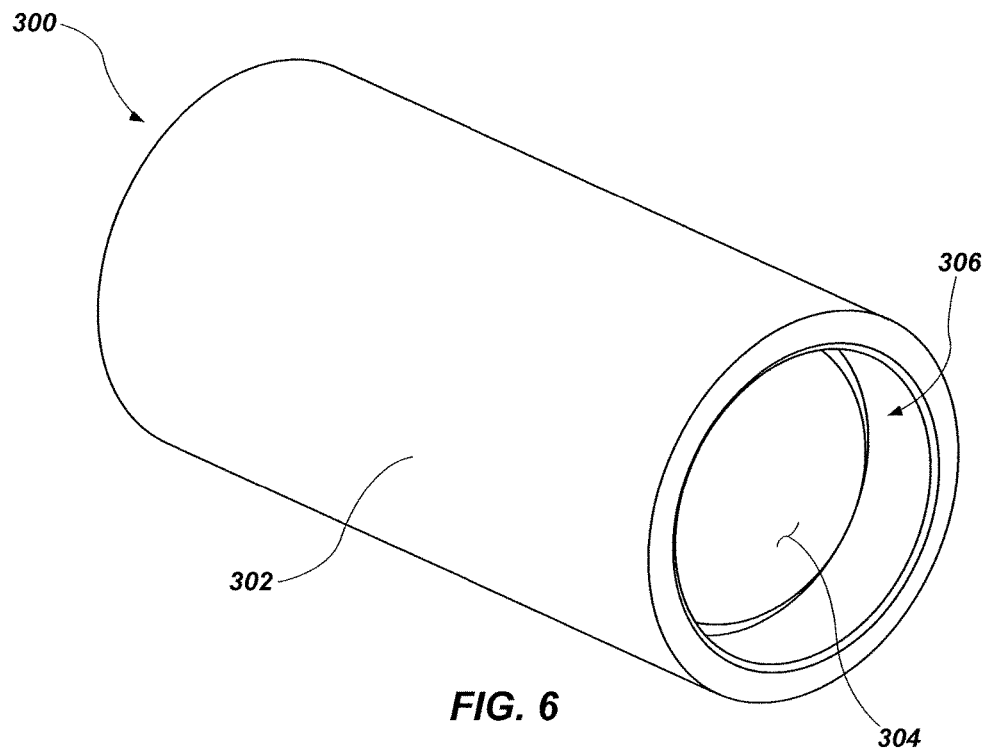
FIG. 6 is a perspective view of a launch tube assembly including a gas generator in accordance with another embodiment of the present disclosure.

FIG. 6 is a perspective view of a launch tube assembly 300 having a gas generator positioned therein (e.g., a gas generator 100 discussed above with reference to any of FIGS. 1 through 5). As shown in FIG. 6, the launch tube assembly 300 includes a launch tube 302 (e.g., a cylindrical launch tube) having a longitudinal axis $L_{302}$ (e.g., centerline) (see FIG. 7) and a launch component 304 that may be disposed in the launch tube 302. In some embodiments, the launch component 304 may include one or more projectiles (e.g., a self-propelled projectile, a flare, etc.) to be launched from an open end 306 of the launch tube 302. For example, the projectile may include one or more integral elements for protecting it from the propulsive jets produced by the gas generator 100 (e.g., a heat shield) or the projectile (e.g., a flare) may be intended to have a portion thereof ignited by the propulsive jets produced by the gas generator 100. In some embodiments, the self-propelled projectile may include an unmanned aerial vehicle (UAV) (i.e., a drone), such as, for example, an up-scaled or larger SWITCH-BLADE® aircraft, manufactured by AeroVironment of Monrovia, Calif. In other embodiments, the launch component 304 may, optionally, have associated therewith, a piston (e.g., a ram or pusher plate) configured to be positioned between the projectile and the gas generator 100 in order to at least partially isolate the projectile from the propulsive jets produced by the gas generator 100 while still imparting the thrust generated by the gas generator 100 to the projectile. In yet other embodiments, the launch component 304 may include a piston and a projectile. In some embodiments, the gas generator 100 may be used to launch a projectile (e.g., a UAV) having a mass from about 20 lb (9 kg) to about 40 lb (18 kg).

Figure 7:
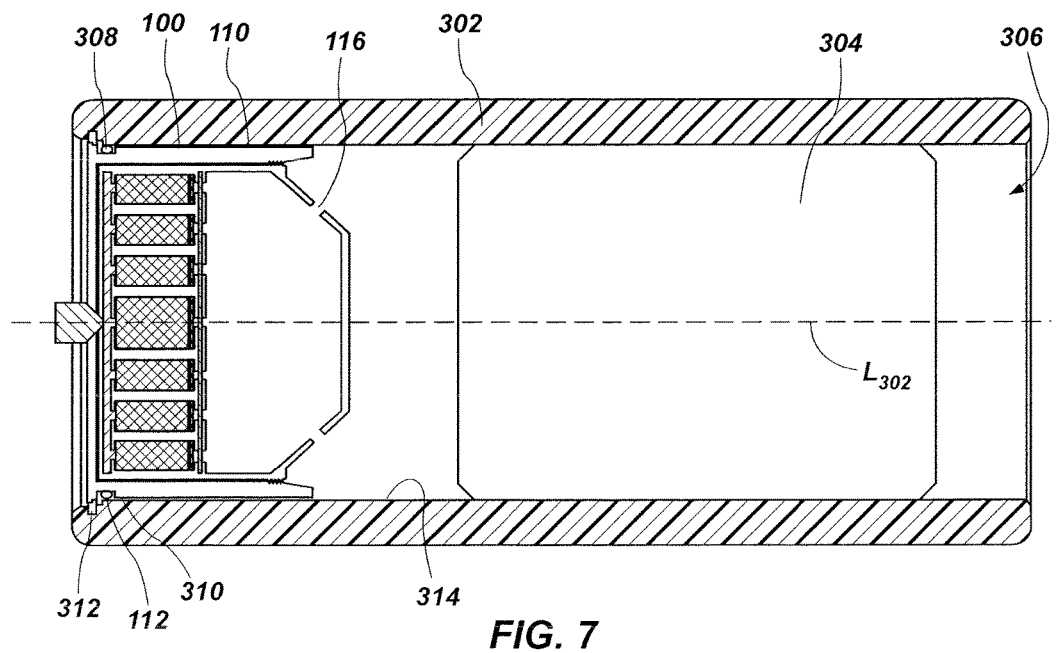
FIG. 7 is a partial cross-sectional view of the launch tube assembly shown in FIG. 6.

FIG. 7 is a partial cross-sectional view of the launch tube assembly 300 shown in FIG. 6. As shown in FIG. 7, the housing 102 (FIG. 3) of the gas generator 100 may be formed to have a substantially cylindrical shape including a cylindrical outer surface 110 sized to fit within a launch tube 302. For example, the housing 102 may be formed to fit within the launch tube 302, which has a complementary cylindrical shape, such that the outer surface 110 of the housing 102 opposes an inner surface 314 of the launch tube 302. The gas generator 100 may be positioned within the launch tube 302 such that the propulsive jets, which extend through apertures 116, are directed toward the open end 306 of the launch tube 302 (e.g., along the longitudinal axis $L_{302}$ of the launch tube 302, which may coincide with the longitudinal axis $L_{102}$ of the housing 102).

The gas generator 100 may further include a retaining feature 112 for securing the gas generator 100 within the launch tube 302. For example, the retaining feature 112 may include a flange configured to engage with a complementary groove 308 formed at an end of the launch tube 302 opposing the open end 306. The retaining feature 112 of the gas generator 100 may abut against the groove 308 in the launch tube 302, and the gas generator 100 may be secured and sealed within the launch tube 302, for example, with an O-ring 310 and a snap ring 312. In some embodiments, the gas generator 100 may be secured and sealed within the launch tube 302 by threads, a weld, or any other appropriate features. Such a configuration may act to seal a portion of the gas generator 100 (e.g., cylindrical outer surface 110 (FIG. 1)) against the inner wail 314 of the launch tube 302 to at least partially prevent gases formed by the gas generator 100 from traveling around the gas generator 100 to a back portion of the gas generator 100 at the end of the launch tube 302 opposing the open end 306.

In operation, a gas generator 100 may be utilized to supply an initial velocity to a projectile launched (i.e., a cold launch) from a launch tube (e.g., launch tube 302). For example, propellant 126 in the gas generator 100 positioned within the launch tube 302 may be ignited by an initiator 130. Ignition and subsequent combustion of the propellant 126 may produce an exothermic reaction, forming gases to fill the cylindrical propellant chamber 120 and the annular propellant chambers 122a, 122b, 122c of the gas generator 100. As the gases are produced, the propellant chambers 120, 122a, 122b, 122c may become pressurized (e.g., to about 4,000 psi to about 15,000 psi (about 27.6 MPa to about 103.4 MPa)).

In embodiments including the burst foil 134 initially covering apertures 128a, 128b, 128c, 128d, the burst foil 134 may fail under the force applied thereto by the pressurized gas within each propellant chamber 120, 122a, 122b, 122c. In other embodiments, the gas pressure building in the propellant chambers 120, 122a, 122b, 122c may act after initiation of the propellant 126 to continually force gases through the apertures 128a, 128b, 128c, 128d into the expansion chamber 124. The propellant gases travel from the propellant chambers 120, 122a, 122b, 122c through the apertures 128a, 128b, 128c, 128d to the expansion chamber 124.

The expansion chamber 124 may cause the pressure and temperature of the gas to drop as the gas leaves the cylindrical propellant chamber 120 and the annular propellant chambers 122a, 122b, 122c via the apertures 128a, 128b, 128c, 128d. For example, the pressure of the gas may drop to about 1,500 psia to about 400 psia (about 10.34 MPa to about 2.76 MPa) after entering the expansion chamber 124.

The gas may then be directed out the gas generator 100 in a selected direction (e.g., generally along the longitudinal axis $L_{102}$ of the housing 102) to form propulsive jets that fill the volume behind the projectile with high-pressure gas that applies a force (e.g., thrust) to the projectile (e.g., directly or via a piston) to impart an initial velocity to the projectile. For example, the expansion chamber 124 may act to redirect the gases such that the gas exits the expansion chamber 124 in a direction of travel different from the direction of travel that the gas entered the expansion chamber 124. In some embodiments, the direction that the gas passes through the apertures 128a, 128b, 128c, 128d may be offset (e.g., about 45 degrees) from the direction that the gas passes through the apertures 116.

In view of the above, embodiments of the present disclosure may be particularly useful in providing gas generators of a relatively straightforward, robust and reliable design for generating gas and directing the gas from within the gas generator to surrounding environments (e.g., in the form of a propulsive jet). Such a design may minimize costs associated with the components of the gas generator and the overall size and weight of the gas generator. For example, some embodiments of the gas generators disclosed herein may enable the use of widely available (e.g., commercial off-the-shelf (COTS)) ignition and fuel components. Further, some embodiments of the gas generators disclosed herein may have progressive burn and thrust profiles, which may be beneficial in some launch applications.

While the gas generators have been described herein with general reference to use with launch tubes for projectiles, it is noted that the gas generators may be utilized in other applications such as, for example, applications where gas generators are utilized as inflator devices or in any suitable applications where relatively large volumes of gas are utilized, but storing such gas in a pressurized state is undesirable or impractical.

While the present disclosure may be susceptible to various modifications and alternative forms, specific embodiments have been shown by way of example in the drawings and have been described in detail herein. However, it should be understood that the disclosure is not limited to the particular forms disclosed. Rather, the disclosure includes all modifications, equivalents, legal equivalents, and alternatives falling within the scope of the disclosure as defined by the appended claims.

What is claimed is:

1. A gas generator for use in launching a projectile, comprising:
   a housing sized and configured to be located within a launch tube for the projectile, the housing defining:
      a first propellant chamber;
      at least a second propellant chamber comprising a ring situated concentrically around the first propellant chamber;
      an expansion chamber;
      at least one first aperture between the first propellant chamber and the expansion chamber; and
      at least one second aperture between the at least a second propellant chamber and the expansion chamber;
   at least one propellant within each of the first propellant chamber and the at least a second propellant chamber of the housing; and
   a pyrotechnic delay connecting the first propellant chamber and the at least a second propellant chamber.

2. The gas generator of claim 1, wherein the at least one first aperture and the at least one second aperture comprise a plurality of first apertures and a plurality of second apertures.

3. The gas generator of claim 1, further comprising a burst foil between at least one of the first propellant chamber and the at least a second propellant chamber and the at least one first aperture and the at least one second aperture.

4. The gas generator of claim 1, wherein the at least a second propellant chamber comprises a plurality of concentric propellant chambers.

5. The gas generator of claim 4, further comprising a pyrotechnic delay between each of the concentric propellant chambers.

6. The gas generator of claim 1, further comprising a screen between at least one of the first propellant chamber and the second propellant chamber and at least one of the at least one first aperture and the at least one second aperture.

7. The gas generator of claim 1, further comprising an initiator for igniting the pyrotechnic delay and the at least one propellant within the first propellant chamber.

8. The gas generator of claim 7, wherein the pyrotechnic delay is configured to ignite the at least one propellant within the at least a second propellant chamber after ignition of the at least one propellant within the first propellant chamber.

9. The gas generator of claim 1, wherein the housing has a substantially cylindrical shape.

10. The gas generator of claim 1, wherein the housing has an outer surface sized and configured to be positioned adjacent to and engage with an inner surface of the launch tube when the gas generator is disposed within the launch tube.

11. The gas generator of claim 1, wherein the expansion chamber of the gas generator is in unrestricted communication with at least one third aperture to enable gas within the expansion chamber of the gas generator to exit the gas generator via the at least one third aperture as at least one propulsive jet.

12. The gas generator of claim 11, wherein a cross-sectional area of each of the at least one first aperture and the at least one second aperture is less than a cross-sectional area of each of the at least one third aperture.

13. The gas generator of claim 1, wherein the at least one propellant comprises a powdered or cast material.

14. A launch tube assembly, comprising:
a launch tube containing at least one projectile; and
a gas generator within the launch tube proximate the at least one projectile, the gas generator comprising:
  a housing comprising:
    a first propellant chamber;
    at least a second propellant chamber comprising a ring situated concentrically around the first propellant chamber;
    an expansion chamber;
    at least one first aperture between the first propellant chamber and the expansion chamber; and
    at least one second aperture between the at least a second propellant chamber and the expansion chamber;
  at least one propellant within each of the first propellant chamber and the at least a second propellant chamber of the housing; and
  a pyrotechnic delay connecting the first propellant chamber and the at least a second propellant chamber.

15. A method of launching a projectile, the method comprising:
igniting a first propellant within a first propellant chamber within a housing of a gas generator;
igniting a pyrotechnic delay within the housing, the pyrotechnic delay connecting the first propellant chamber and at least a second propellant chamber, the at least a second propellant chamber comprising a ring situated concentrically around the first propellant chamber;
igniting a second propellant within the at least a second propellant chamber;
combusting at least a portion of the first propellant and the second propellant to form a gas;
flowing the gas into an expansion chamber within the housing via at least one first aperture between the expansion chamber and the first propellant chamber and at least one second aperture between the expansion chamber and the at least a second propellant chamber;
flowing the gas through a plurality of third apertures formed in the housing to form at least one propulsive jet exiting the housing; and
imparting an initial velocity to a projectile with the at least one propulsive jet.

16. The method of claim 15, further comprising retaining the gas within at least the first propellant chamber with a burst foil until the gas reaches a predetermined pressure within the first propellant chamber.

17. The method of claim 15, further comprising reducing the pressure of the gas as the gas flows into the expansion chamber.

18. The method of claim 15, further comprising forming a plurality of propulsive jets in a ring extending about a longitudinal axis of the housing of the gas generator at an exit portion of the gas generator.

19. The method of claim 15, further comprising simultaneously igniting the pyrotechnic delay and the first propellant with an initiator.

20. The method of claim 15, wherein igniting the second propellant comprises igniting the second propellant after igniting the first propellant.

21. The gas generator of claim 1, wherein the pyrotechnic delay comprises a material selected from the group consisting of boron potassium nitrate ($BKNO_3$), magnesium strontium nitrate ($MgSr(NO_3)_2$), and magnesium-potassium perchlorates.

22. The gas generator of claim 1, wherein the at least one propellant comprises solid grains of propellant.

* * * * *

UNITED STATES PATENT AND TRADEMARK OFFICE
CERTIFICATE OF CORRECTION

PATENT NO.       : 10,281,248 B2
APPLICATION NO.  : 14/938646
DATED            : May 7, 2019
INVENTOR(S)      : James D. Dunaway It is certified that error appears in the above-identified patent and that said Letters Patent is hereby corrected as shown below:

In the Specification
Column 8, Line 63, change "the inner wail" to --the inner wall--

Signed and Sealed this
Ninth Day of July, 2019

Andrei Iancu
*Director of the United States Patent and Trademark Office*